United States Patent Office 3,114,714

Patented Dec. 17, 1963

3,114,714

FERROMAGNETIC MATERIAL

Poul Bernard Braun and Wim Kwestroo, Eindhoven, Netherlands, assignors to North American Philips Company, Inc., New York, N.Y., a corporation of Delaware No Drawing. Filed June 6, 1961, Ser. No. 115,085
Claims priority, application Netherlands June 23, 1960
5 Claims. (Cl. 252—62.5)

The invention relates to ferromagnetic material, in particular for use in magnet cores for high-frequency systems.

In the system $CaO—Fe_2O_3$ several compounds are known, for example the compounds $CaFe_2O_4$, $Ca_2Fe_2O_5$, $CaFe_4O_7$ and $$Ca_3Fe^{2+}Fe^{3+}_{14}O_{25}$$

which are not ferromagnetic. In "Journal of the American Chemical Society," volume 81, No. 15, page 3842 (1959), it is stated that by the reaction of $Fe_2O_3$ in a $CaCl_2$ melt two phases are obtained, i.e., weakly ferromagnetic needles and prisms, which proved to have the crystal structure and the composition $CaFe_2O_4$, and hexagonal transparent plates having the composition $Ca_2Fe_{10}O_{17}$. These plates were sufficiently ferromagnetic for them to be separated from the first fraction. The compound was hexagonal and very similar to magnetoplumbite.

The material according to the invention consists of crystals, or mixed crystals of compounds, having a chemical composition according to the formula $$Ca_{4-a+b}Fe_{18-c+d}D_{2/3\,a+c}M_{2-b-3/2\,d}O_{33}$$

where D is at least one of the metals Y, Nd, Sm, Eu, Gd, Tb, Dy, Ho, Tm, Er, Yb, Lu, Bi and In, M is at least one of the metals Co, Ni, Mg, the complex $$\frac{Li^{+}+Fe^{3+}}{2}$$

and partly Fe and, if $2/3\ a+c>0$, Zn, while $$0 \leqq a \leqq 1.0$$
$$0 \leqq b \leqq 1.7$$
$$0 \leqq c \leqq 0.7$$
$$0 \leqq d \leqq 0.5$$

which have a rhombohedral crystal structure, the unit cell of which can be described in the hexagonal crystal system by a $c$-axis of about 62.3 A. and an $a$-axis of about 6.0 A.

In the crystals of the materials according to the invention, the spontaneous magnetisation extends at right angles to the hexagonal axis and hence parallel to the basal plane of the system. Thus the crystal has a so-called preferred plane of magnetisation. In this plane, the magnetisation direction is far more readily rotatable than in a direction not situated in this plane. Consequently, the materials have soft-magnetic properties. The initial permeability has values which are sufficiently high to be of interest for use in electrical technology.

The metals represented by D have the common property that the radius of their trivalent ions lies between 0.92 A. and 1.15 A. With respect to the metals represented by M, the radius of their bivalent ions and the mean radius of the trivalent Fe-ion and the monovalent Li-ion lies between 0.70 A. and 0.90 A. The materials may contain bivalent iron. Since in this event the value of the resistivity is low, those materials are especially suitable which contain no bivalent iron.

The materials according to the invention may be produced by heating the correctly proportioned finely powdered mixture of the constituent metal oxide to a temperature between about 1100° C. and 1240° C., preferably between 1170° C. and 1210° C. Obviously one or more of the constituent metal oxides may be replaced, entirely or in part, by compounds which when heated are converted to metal oxides, for example carbonates, oxalates and acetates. In addition, the constituent metal oxides may be replaced entirely or in part by one or more reaction products of at least two of the constituent metal oxides, for example $CaFe_2O_4$. The term "correctly proportioned" is used herein to signify proportions of the amounts of the metals in the initial mixture which are approximately equal to those in the compounds to be produced.

The finely powdered initial mixture may first be presintered, at a comparatively low temperature (800° C.–1100° C.), the reaction product being pulverised and the resulting powder being sintered again, and this sequence of operations may be repeated once or a number of times. In order to promote the sintering process, sintering agents, such as silicates and fluorides, may be added.

Bodies consisting of the ferromagnetic materials described may be obtained by sintering the initial mixture of the metal oxides or the like immediately in the desired form, but also by pulverising the reaction product of the pre-sintering process and then, if required after the addition of a binder, shaping and sintering it.

It will be clear that in the method described small amounts of impurities may readily be incorporated in the reaction product formed. Examples of these impurities are $Fe_2O_3$, $CaFe_2O_4$, compounds having garnet structure and compounds having spinel structure.

Obviously, single crystals of the materials according to the invention may also be produced. In view of the incongruous melting point of the materials, one starts from a mixture having a composition different from that of the desired compound, that is to say, a composition which is richer in CaO by 15 to 20 mol percent. The mixture is heated to a temperature such that it is entirely melted (1240° C.–1280° C.). During the subsequent slow cooling, single crystals of the relevant compound are produced. The first 50 degrees of the cooling preferably take 2 hours.

EXAMPLE I

A mixture of $CaCO_3$, $Fe_2O_3$ and $CoCO_3$ having a composition according to the formula of $Ca_{5.3}Fe_{18.0}Co_{0.7}O_{33}$ was mixed with ethyl alcohol in a ball mill for 3 hours. After drying, the mixture was prefired in air at 800° C. for 16 hours and the reaction product was then ground with ethyl alcohol in a ball mill for 1.5 hours. After drying, a small amount of a solution of an organic binder, nitrocellulose, was added to the product, which was then compressed to form rings which were fired in oxygen at 1190° C. for 4 hours. X-ray examination proved that the rings consisted substantially entirely of crystals having the desired structure. For this compound $a=0$; $b=1.3$; $c=0$; $d=0$; while M represents the metal Co.

By the same process, rings having different compositions were made and X-ray examination proved that they all consisted substantially entirely of crystals having the desired structure. The initial mixtures consisted of $CaCO_3$, $Fe_2O_3$ and NiO having a composition according to the formula $Ca_{4.8}Fe_{18.3}Ni_{0.7}O_{33}$ ($a=0$; $b=0.8$; $c=0$; $d=0.3$; M=Ni)

$CaCO_3$, $Fe_2O_3$ and MgO having a composition according to the formula $Ca_{4.8}Fe_{18.3}Mg_{0.7}O_{33}$ ($a=0$; $b=0.8$; $c=0$; $d=0.3$; M=Mg)

$CaCO_3$, $Fe_2O_3$ and $Li_2O$ having a composition according to the formula $$Ca_{5.0}Fe_{18.5}Li_{0.5}O_{33}$$

$$\left(a=0;\ b=1;\ c=0;\ d=0;\ M=\frac{Li^{+}+Fe^{3+}}{2}\right)$$

$CaCO_3$, $Fe_2O_3$, $Y_2O_3$ and ZnO having a composition according to the formula $$Ca_{4.5}Fe_{18.0}Y_{0.6}Zn_{0.6}O_{33}\ (a=0.9;\ b=1.4;\ c=0;\ d=0;\ D=Y;\ M=Zn)$$

$CaCO_3$, $Fe_2O_3$, $Y_2O_3$ and MgO having a composition according to the formula $$Ca_{4.5}Fe_{18.0}Y_{0.6}Mg_{0.6}O_{33}\ (a=0.9;\ b=1.4;\ c=0;\ d=0;\ D=Y;\ M=Mg)$$

Some properties of these rings were measured. The following tables show the resistivity $\rho$ expressed in $\Omega$ cm. and the initial permeability and the loss factor tan $\delta$ at various frequencies. Owing to the electromagnetic losses there is a phase difference between the field strength and the induction. Hence the initial permeability is usually expressed as a complex quantity. In the tables the value of the real part $\mu'$ of the initial permeability is given. The loss factor tan $\delta$ is equal to $$\frac{\mu''}{\mu'}$$

where $\mu''$ is the imaginary part of the initial permeability.

What is claimed is:

1. A ferromagnetic material consisting essentially of crystals having a composition $$Ca_{4-a+b}Fe^{+++}_{18-c+d}D_{\frac{2}{3}a+c}M^{++}_{2-b-\frac{3}{2}d}O_{33}$$

where D is at least one metal selected from the group consisting of Y, Nd, Sm, Eu, Gd, Tb, Dy, Ho, Tm, Er, Yb, Lu, Bi, and In, M is at least one divalent metal ion selected from the group consisting of $Co^{++}$, $Ni^{++}$, $Mg^{++}$, $Zn^{++}$, $Fe^{++}$, and the complex $$\frac{Li^{+}+Fe^{+++}}{2}$$

at least one of said elements represented by the symbol D being present when the divalent metal ion M is $Zn^{++}$, and at least one of the metal ions $Co^{++}$, $Ni^{++}$, and $Mg^{++}$ being present when the metal ion is $Fe^{++}$, and where $a$ has a value up to 1.0
$b$ has a value up to 1.7
$c$ has a value up to 0.7
$d$ has a value up to 0.5
and $a+b+c+d$ is at least 1.0, at least one of the elements designated D and M being present in said composition, said crystals having a rhombohedral crystal structure the unit cell of which, in the hexagonal system, has a $c$-axis of about 62.3 A. and an $a$-axis of about 6.0 A.

2. A method of manufacturing a ferromagnetic material comprising the steps of mixing, in finely-divided form, a mixture of oxidic components yielding upon subsequent heating crystals having a composition $$Ca_{4-a+b}Fe^{+++}_{18-c+d}D_{\frac{2}{3}a+c}M_{2-b-\frac{3}{2}d}O_{33}$$

where D is a metal selected from the group consisting of Y, Nd, Sm, Eu, Gd, Tb, Dy, Ho, Tm, Er, Yb, Lu, Bi, and In, and M is a metal ion selected from the group $Co^{++}$, $Ni^{++}$, $Mg^{++}$, $Zn^{++}$, $Fe^{++}$, and $$\frac{Li^{+}+Fe^{+++}}{2}$$

at least one metal from said group represented by the symbol D being present when M is $Zn^{++}$, and at least one of the metal ions, $Mg^{++}$, $Ni^{++}$ and $Co^{++}$ being present when $Fe^{++}$ is present; and where $a$ has a value up to 1.0
$b$ has a value up to 1.7
$c$ has a value up to 0.7
$d$ has a value up to 0.5
and $a+b+c+d$ has a value of at least 1.0, at least one of said metals designated D and M being

*Table I*

| | Ωρcm. | 1 mc./s. | | 5 mc./s. | | 70 mc./s. | | 100 mc./s. | |
|---|---|---|---|---|---|---|---|---|---|
| | | $\mu'$ | tan $\delta$ | $\mu'$ | tan $\delta$ | $\mu'$ | tan $\delta$ | $\mu'$ | tan $\delta$ |
| $Ca_{5.3}Fe_{18.0}Co_{0.7}O_{33}$ | $7\times10^8$ | 3.64 | 0.03 | 3.1 | 0.03 | 2.3 | 0.04 | 2.3 | 0.12 |
| $Ca_4Fe_{18.3}Ni_{0.7}O_{33}$ | $7\times10^8$ | 7.9 | 0.02 | 9.0 | 0.04 | 5.5 | 0.34 | 5.2 | 0.37 |
| $Ca_{4.8}Fe_{18.3}Mg_{0.7}O_{33}$ | $1\times10^4$ | 17.0 | 0.03 | 21.1 | 0.11 | 10.6 | 0.38 | 9.75 | 0.46 |
| $Ca_{5.0}Fe_{18.5}Li_{0.5}O_{33}$ | $7.1\times10^6$ | 6.7 | 0.03 | 7.8 | 0.06 | 4.8 | 0.25 | 4.3 | 0.30 |

*Table II*

| | Ωρcm. | 10 mc./s. | | 20 mc./s. | | 30 mc./s. | | 80 mc./s. | | 150 mc./s. | |
|---|---|---|---|---|---|---|---|---|---|---|---|
| | | $\mu'$ | tan $\delta$ | $\mu'$ | tan $\delta$ | $\mu'$ | tan $\delta$ | $\mu'$ | tan $\delta$ | $\mu'$ | tan $\delta$ |
| $Ca_{4.5}Fe_{18.0}Y_{0.6}Zn_{0.6}O_{33}$ | $6.5\times10^6$ | 15.8 | 0.15 | 15.6 | 0.21 | 12.5 | 0.29 | 10.2 | 0.24 | 9.0 | 0.48 |
| $Ca_{4.5}Fe_{18.0}Y_{0.6}Mg_{0.6}O_{33}$ | $1.3\times10^6$ | 16.2 | 0.10 | 16.4 | 0.13 | 13.9 | 0.19 | 11.8 | 0.23 | 12.0 | 0.37 |

EXAMPLE II

A mixture of 11.0 g. of $CaCO_3$, 2.1 g. of $MgCO_3$, 1.4 g. of $Y_2O_3$ and 28.4 g. of $Fe_2O_3$ (corresponding to 35 mol. percent of CaO, 7 mol. percent of MgO, 2 mol. percent of $Y_2O_3$ and 56 mol. percent of $Fe_2O_3$) was heated in a platinum crucible in an oxygen atmosphere. The mixture began to melt at about 1220° C. It was heated to 1280° C., and then slowly cooled. Cooling to 1220° C. was effected in three hours, subsequently cooling to room temperature in 6 hours. A number of crystals then formed, the composition of which was determined by chemical analysis and the structure of which determined by X-ray examination. The crystal structure was rhombohedral and the elementary cell could be described in the hexagonal crystal system by a $c$-axis of about 62.3 A. and an $a$-axis of about 6.0 A. The crystals proved to be crystals of the compound $$Ca_{4.1}Y_{0.7}Mg_{1.6}Fe_{17.5}O_{33}\ (a=0.3;\ b=0.4;\ c=0.5;\ d=0;\ D=Y;\ M=Mg)$$

The saturation magnetisation of the crystals was 28 gauss.cc./g. at room temperature, whilst the Curie temperature was 175° C.

present in said composition, and heating said mixture to a temperature of about 1100° to 1240° C. to form said crystals.

3. A method of manufacturing a ferromagnetic material as defined in claim 2 in which the mixture is heated to a temperature of about 1170° to 1210° C.

4. A method of manufacturing single crystals of a ferromagnetic material as defined in claim 2 in which the mixture contains an excess of 15 to 20 mol percent of CaO, is heated to a temperature of 1240° to 1280° C. to form a melt which is slowly cooled.

5. A method of manufacturing single crystals of a ferromagnetic material as defined in claim 4 in which the melt is cooled the first 50 degrees in two hours.

References Cited in the file of this patent

UNITED STATES PATENTS

| | | |
|---|---|---|
| 1,946,964 | Cobb | Feb. 13, 1934 |
| 3,043,654 | Brixner | July 10, 1962 |
| 3,043,776 | Jonker | July 10, 1962 |
| 3,072,575 | Gorter et al. | Jan. 8, 1963 |